United States Patent
Dickie et al.

(10) Patent No.: US 10,102,452 B2
(45) Date of Patent: Oct. 16, 2018

(54) SYSTEMS AND METHODS FOR IDENTIFYING AN IMAGED NEEDLE IN AN ULTRASOUND IMAGE

(71) Applicant: Clarius Mobile Health Corp., Burnaby (CA)

(72) Inventors: Kris Dickie, Vancouver (CA); Nishant Uniyal, Vancouver (CA)

(73) Assignee: Clarius Mobile Health Corp., Burnaby, British Columbia (CA)

( * ) Notice: Subject to any disclaimer, the term of this patent is extended or adjusted under 35 U.S.C. 154(b) by 0 days.

(21) Appl. No.: 15/458,967

(22) Filed: Mar. 14, 2017

(65) Prior Publication Data

US 2018/0268259 A1    Sep. 20, 2018

(51) Int. Cl.
*G06K 9/00* (2006.01)
*G06K 9/62* (2006.01)
*G06K 9/46* (2006.01)

(52) U.S. Cl.
CPC ......... *G06K 9/6267* (2013.01); *G06K 9/4604* (2013.01); *G06K 9/4671* (2013.01);
(Continued)

(58) Field of Classification Search
CPC ........... G06T 2211/40; G06T 2211/404; G06T 2207/10072; G01R 33/5608; G01N 23/046
See application file for complete search history.

(56) References Cited

U.S. PATENT DOCUMENTS 6,157,737 A * 12/2000 Ishikawa ............ G06K 9/00456
                                                      382/195
7,702,019 B2 * 4/2010 Iwasaki ................... G06T 7/20
                                                      375/240.16
(Continued)

FOREIGN PATENT DOCUMENTS

WO    2015092582 A1    6/2015

OTHER PUBLICATIONS

Chernov, T., Kliatskine, V., & Nikolaev, D. (2015). "A Method of Periodic Pattern Detection on Document Images", in Proceedings 29th European Conference on Modelling and Simulation. Conference date: May 26-29, 2015.
(Continued)

*Primary Examiner* — Avinash Yentrapati
(74) *Attorney, Agent, or Firm* — Julian Ho

(57) ABSTRACT

The present embodiments relate generally to ultrasound imaging methods, systems, and apparatus that identify an imaged needle in an ultrasound image. The embodiments involve performing edge detection on the ultrasound image to generate an edge-detected data set corresponding to the ultrasound image; performing a straight line detection operation on the edge-detected data set to detect one or more straight lines; based on the one or more straight lines detected in the edge-detected data set, identifying a region of interest (ROI) on the ultrasound image; transforming the ROI of the ultrasound image from a spatial domain to an analysis domain, to generate a transformed ROI; analyzing the transformed ROI to determine whether the transformed ROI, in the analysis domain, corresponds to a needle signature; and if the transformed ROI corresponds to the needle signature, identifying the detected one or more straight lines as the imaged needle.

20 Claims, 5 Drawing Sheets

(Continued)

(2 of 5 Drawing Sheet(s) Filed in Color)

(52) U.S. Cl.
CPC ... *G06K 9/6218* (2013.01); *G06K 2009/4666* (2013.01); *G06K 2209/057* (2013.01)

(56) References Cited

U.S. PATENT DOCUMENTS

| | | | | |
|---|---|---|---|---|
| 2006/0262857 A1* | 11/2006 | Iwasaki | ............ | G06K 9/00348 375/240.19 |
| 2010/0298705 A1* | 11/2010 | Pelissier | ............ | A61B 8/0833 600/443 |
| 2011/0002522 A1* | 1/2011 | Goto | ............ | G06T 7/0012 382/131 |
| 2011/0096954 A1* | 4/2011 | Dahl | ............ | G06F 3/017 382/103 |
| 2011/0142323 A1* | 6/2011 | Chen | ............ | G06K 9/4633 382/132 |
| 2011/0188740 A1* | 8/2011 | Lim | ............ | G06K 9/00 382/154 |
| 2013/0310691 A1 | 11/2013 | Furman et al. | | |
| 2014/0128728 A1 | 5/2014 | Baek et al. | | |
| 2014/0171793 A1* | 6/2014 | Lin | ............ | A61B 8/0841 600/424 |
| 2014/0187942 A1 | 7/2014 | Wang et al. | | |
| 2014/0296694 A1 | 10/2014 | Jaworski | | |
| 2015/0125079 A1* | 5/2015 | Moon | ............ | G06K 9/4633 382/190 |
| 2015/0254401 A1* | 9/2015 | Sankhe | ............ | G06F 19/321 382/132 |
| 2016/0199023 A1* | 7/2016 | Pelissier | ............ | A61B 8/4254 600/424 |
| 2016/0247271 A1* | 8/2016 | Hishida | ............ | G01N 23/04 |
| 2017/0273661 A9* | 9/2017 | Tashiro | ............ | A61B 8/0841 |

OTHER PUBLICATIONS

Fisher, R., Perkins, S., Walker, A., & Wolfart, E. (2003). "Fourier Transform", available at http://homepages.inf.ed.ac.uk/rbf/HIPR2/fourier.htm, last accessed Mar. 14, 2017.

Rao, R. "Texture" [PDF]. CSE 455. University of Washington, WA. Jan. 2, 2009. Retrieved from https://courses.cs.washington.edu/courses/cse455/09wi/Lects/lect12.pdf, last accessed Mar. 16, 2017.

Zhuang, B., Dickie, K., and Pelissier, L. "Adaptive spatial compounding for needle visualization." Ultrasonics Symposium (IUS), 2011 IEEE International. IEEE, 2011.

* cited by examiner

SYSTEMS AND METHODS FOR IDENTIFYING AN IMAGED NEEDLE IN AN ULTRASOUND IMAGE

FIELD

The present disclosure relates generally to ultrasound imaging, and in particular, systems and methods for identifying an imaged needle in an ultrasound image.

BACKGROUND

Ultrasound imaging systems are a powerful tool for performing real-time imaging procedures in a wide range of medical applications. For example, in intervention procedures (e.g., nerve blocks, vascular access), needles are often used for administration of medicine or evacuation of fluid contents. Using ultrasound guidance while inserting a needle enhances the safety and efficacy of procedures by increasing the accuracy of the needle path to the target site.

To assist ultrasound operators in distinguishing the needle from other imaged tissue, it is helpful to highlight or otherwise enhance the appearance of a needle in an ultrasound image feed. Traditional enhancement techniques may use ultrasound beam steering along with modification of imaging parameters like dynamic range and noise floor to enhance acoustically reflective structures. However, this may result in imaging artifacts since all reflective structures perpendicular to the ultrasound beam are highlighted. Other needle highlighting techniques like magnetic tracking also provide needle trajectory information but such methods rely on additional bulky/cumbersome hardware and specialized equipment.

To truly highlight just the needle itself without the use of additional hardware, an ultrasound system must first identify an imaged needle in an ultrasound image. Some traditional attempts to identify a needle involve using image analysis techniques to identify needle like structures in an ultrasound image. However, such traditional techniques may result in false positives because there may be tissue structures (e.g., bones, blood vessel walls) that also appear like a needle in an ultrasound image.

There is thus a need for improved ultrasound systems and methods that identify an imaged needle in an ultrasound image without the use of additional or specialized equipment. The embodiments discussed herein may address and/or ameliorate at least some of the aforementioned drawbacks identified above. The foregoing examples of the related art and limitations related thereto are intended to be illustrative and not exclusive. Other limitations of the related art will become apparent to those of skill in the art upon a reading of the specification and a study of the drawings herein.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

Non-limiting examples of various embodiments of the present disclosure will next be described in relation to the drawings, in which.

DETAILED DESCRIPTION

Figure 1:
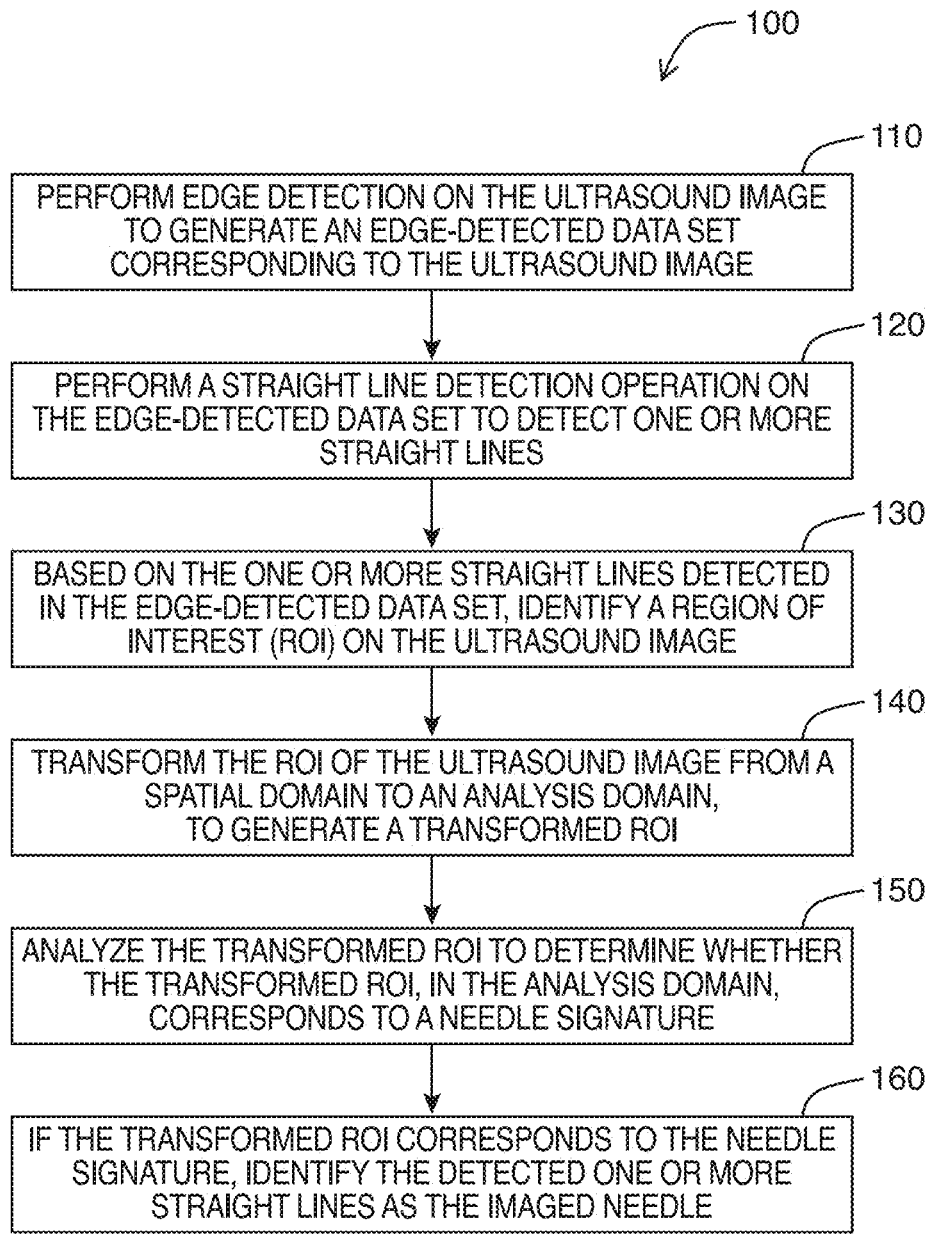
FIG. 1 is a flowchart diagram showing steps of a method for identifying an imaged needle in an ultrasound image, in accordance with at least one embodiment of the present invention.

In a first broad aspect of the present disclosure, there is provided a method of identifying an imaged needle in an ultrasound image, the method involving: performing edge detection on the ultrasound image to generate an edge-detected data set corresponding to the ultrasound image; performing a straight line detection operation on the edge-detected data set to detect one or more straight lines; based on the one or more straight lines detected in the edge-detected data set, identifying a region of interest (ROI) on the ultrasound image; transforming the ROI of the ultrasound image from a spatial domain to an analysis domain, to generate a transformed ROI; analyzing the transformed ROI to determine whether the transformed ROI, in the analysis domain, corresponds to a needle signature; and if the transformed ROI corresponds to the needle signature, identifying the detected one or more straight lines as the imaged needle.

In some embodiments, the transforming includes performing a Fourier transform on the ROI, and the analysis domain includes the spatial frequency domain.

In some embodiments, the transformed ROI includes first pixel values in the analysis domain having a first orientation relationship, and the needle signature includes a second orientation relationship, and the analyzing includes comparing the first orientation relationship of the first pixel values to the second orientation relationship. In some embodiments, the first orientation relationship includes a linearity measurement of the first pixel values, and the second orientation relationship includes a threshold for the linearity measurement. In some embodiments, the linearity measurement includes an eigenvalue ratio of the first pixel values.

In some embodiments, prior to performing the straight line detection operation, the method further involves: performing a contour filtering operation on the edge-detected data set. In some embodiments, the straight line detection operation includes a Hough transform operation.

In some embodiments, the method further involves clustering the one or more straight lines detected on the edge-detected data set. In some embodiments, the method further involves identifying the ROI based on a density of the clustered one or more straight lines. In some embodiments, the clustering results in groups of clustered lines, and the identifying the ROI is based on respective sizes of the groups of clustered lines.

In some embodiments, the edge-detected data set includes a binary image corresponding to the ultrasound image.

In some embodiments, the method further involves downsampling the ultrasound image, where the edge detection is performed on the downsampled ultrasound image.

In some embodiments, upon identifying the detected one or more straight lines as the imaged needle, the method further involves: creating a mask highlighting the imaged needle; and combining the mask with the ultrasound image. In some embodiments, the mask is upsampled prior to the combining of the mask with the ultrasound image.

In another broad aspect of the present disclosure, there is provided an ultrasound imaging apparatus for identifying an imaged needle in an ultrasound image, having: a processor; and a memory storing instructions for execution by the processor. When the instructions are executed by the processor, the processor is configured to: perform edge detection on the ultrasound image to generate an edge-detected data set corresponding to the ultrasound image; perform a straight line detection operation on the edge-detected data set to detect one or more straight lines; based on the one or more straight lines detected in the edge-detected data set, identify a region of interest (ROI) on the ultrasound image; transform the ROI of the ultrasound image from a spatial domain to an analysis domain, to generate a transformed ROI; analyze the transformed ROI to determine whether the transformed ROI, in the analysis domain, corresponds to a needle signature; and if the transformed ROI corresponds to the needle signature, identify the detected one or more straight lines as the imaged needle.

In some embodiments, the transform involves performing a Fourier transform on the ROI, and the analysis domain includes the spatial frequency domain.

In some embodiments, the transformed ROI includes first pixel values in the analysis domain having a first orientation relationship, and the needle signature includes a second orientation relationship, and the analyzing includes comparing the first orientation relationship of the first pixel values to the second orientation relationship. In some embodiments, the first orientation relationship includes a linearity measurement of the first pixel values, and the second orientation relationship includes a threshold for the linearity measurement.

In another broad aspect of the present disclosure, there is provided a computer readable medium storing instructions for identifying an imaged needle in an ultrasound image, the instructions for execution by a processor of a computing device. When the instructions are executed by the processor, the processor is configured to: perform edge detection on the ultrasound image to generate an edge-detected data set corresponding to the ultrasound image; perform a straight line detection operation on the edge-detected data set to detect one or more straight lines; based on the one or more straight lines detected in the edge-detected data set, identify a region of interest (ROI) on the ultrasound image; transform the ROI of the ultrasound image from a spatial domain to an analysis domain, to generate a transformed ROI; analyze the transformed ROI to determine whether the transformed ROI, in the analysis domain, corresponds to a needle signature; and if the transformed ROI corresponds to the needle signature, identify the detected one or more straight lines as the imaged needle.

In some embodiments, the transform includes performing a Fourier transform on the ROI, and the analysis domain includes the spatial frequency domain.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, certain steps, signals, protocols, software, hardware, networking infrastructure, circuits, structures, techniques, well-known methods, procedures and components have not been described or shown in detail in order not to obscure the embodiments generally described herein.

Furthermore, this description is not to be considered as limiting the scope of the embodiments described herein in any way. It should be understood that the detailed description, while indicating specific embodiments, are given by way of illustration only, since various changes and modifications within the scope of the disclosure will become apparent to those skilled in the art from this detailed description. Accordingly, the specification and drawings are to be regarded in an illustrative, rather than a restrictive, sense.

Referring to FIG. 1, shown there generally as 100 is a flowchart diagram having steps of a method for identifying an imaged needle in an ultrasound image, in accordance with at least one embodiment of the present invention. In discussing the method of FIG. 1, reference will simultaneously be made to FIG. 2, which illustrates generally as 200 a series of images resulting from performing acts of the method of FIG. 1 on an ultrasound image, in accordance with at least one embodiment.

Figure 2:
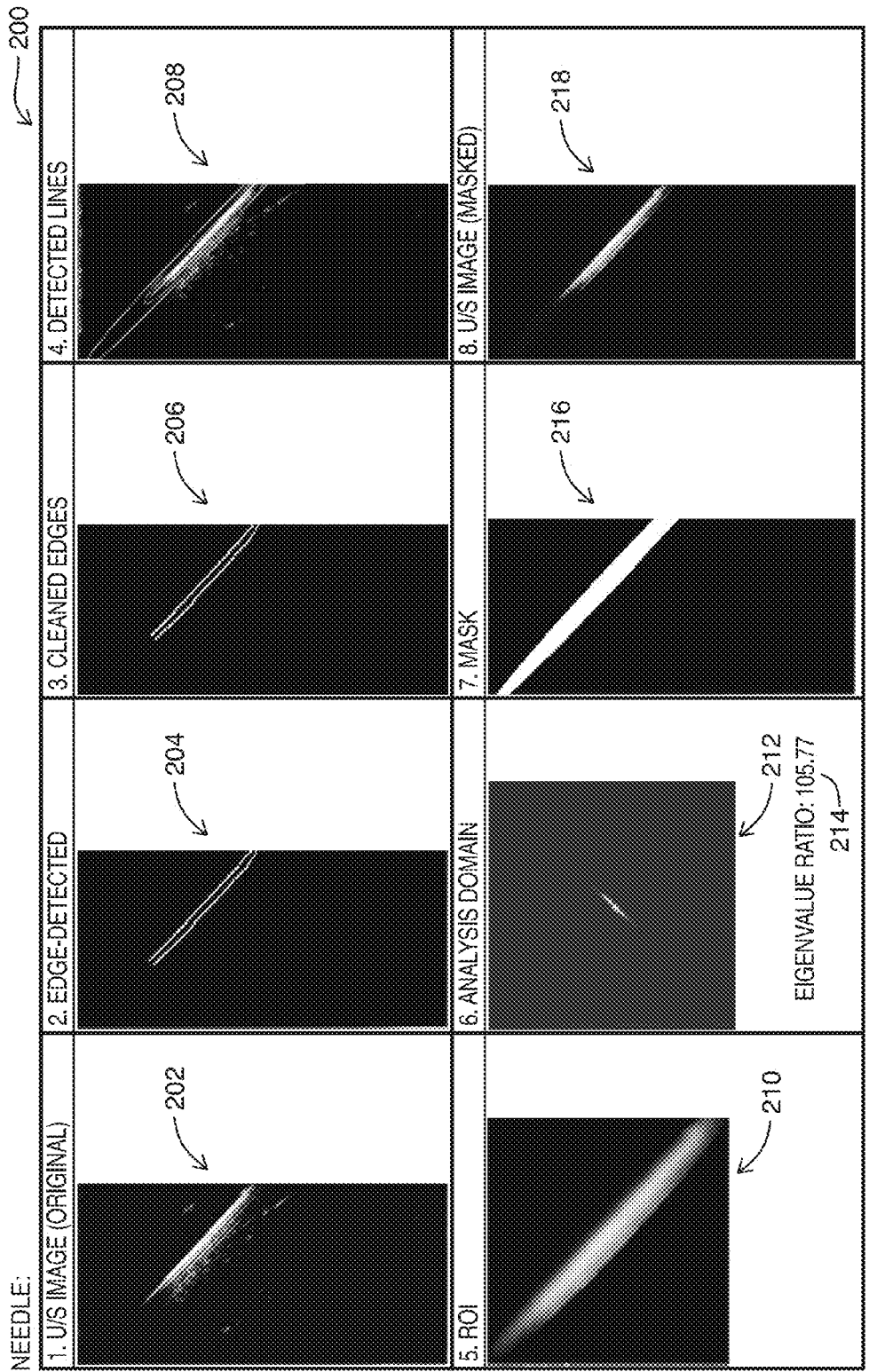
FIG. 2 are a series of images showing the result of performing acts of the present methods in an ultrasound image having an imaged needle, in accordance with at least one embodiment.
Figure 3:
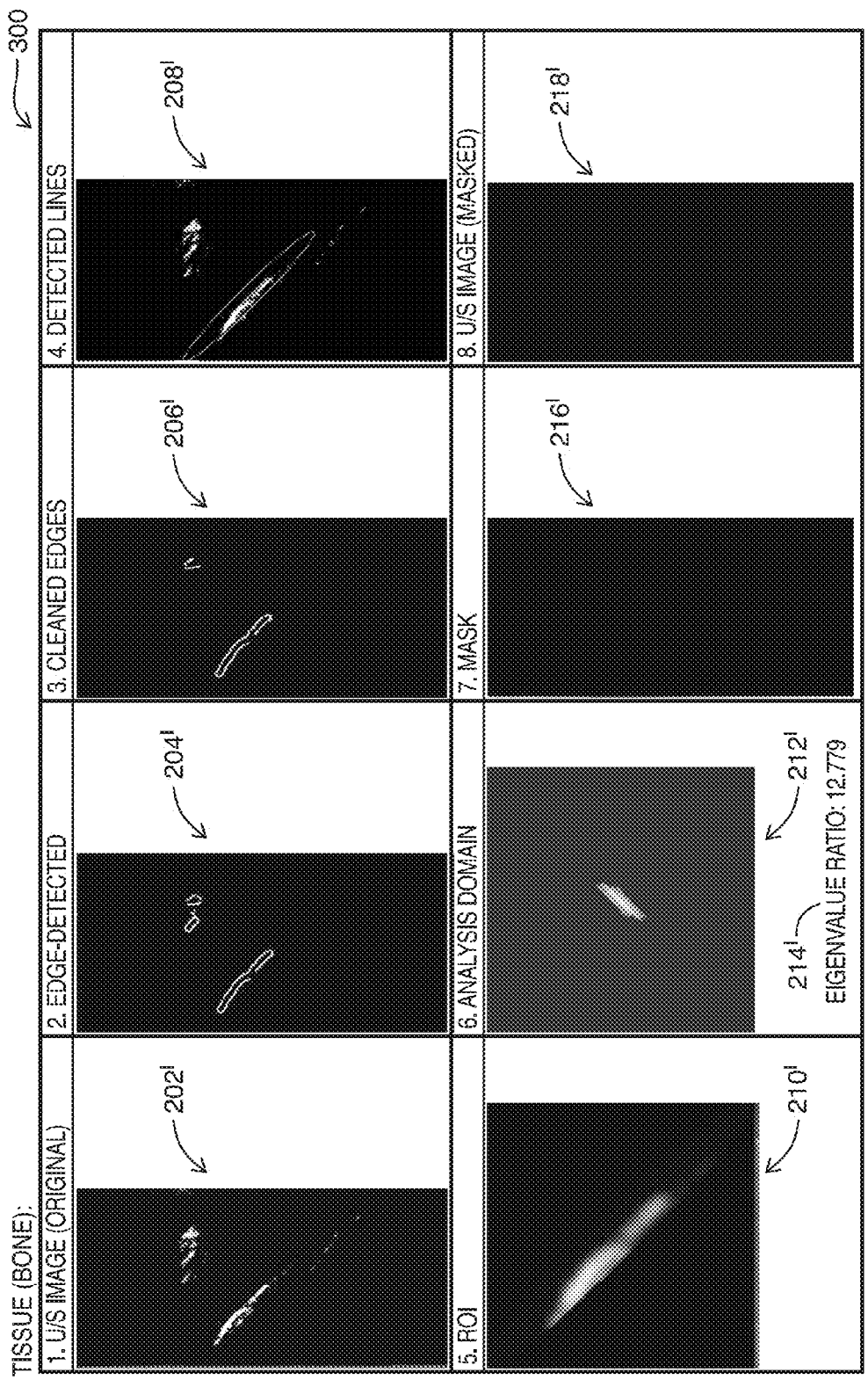
FIG. 3 are a series of images showing the result of performing acts of the present methods in an ultrasound image having tissue, in accordance with at least one embodiment.

As discussed below, FIG. 2 shows the application of the method of FIG. 1 on an ultrasound image having an imaged needle, and how the imaged needle may be identified. In contrast, FIG. 3 shows the application of the method of FIG. 1 on an ultrasound image having tissue (e.g., bone) that traditional methods may falsely identify as a needle, but for which the present methods may not result in a false positive needle identification.

At act 110, the method involves performing edge detection on the ultrasound image to generate an edge-detected data set corresponding to the ultrasound image. As will be understood by persons skilled in the art, edge detection is an image processing technique that can find boundaries of objects within images, typically by detecting points in a digital image where the brightness of image has discontinuities (e.g., changes sharply). Various suitable edge techniques may be used at act 110. For example, in some embodiments, the Canny edge detector technique, Sorbel operator, Mathematical morphology, Robert Cross, Compass, and/or other differential based methods may be used.

Referring simultaneously to FIG. 2, shown there are a series of eight (8) images that show the result after successive acts of the methods described herein. The sequence of images is labeled through '1' to '8' to show the progression through the method. The original ultrasound image 202 is shown with a bright line that corresponds to an imaged needle. In various embodiments, the original ultrasound image 202 may be acquired using a steered frame.

In an intervention procedure, a needle may be inserted into the surface of the skin towards a tissue structure. Due to the insertion angle of the needle, the ultrasound signals emitted from an ultrasound transducer may reflect off the needle at an angle that does not allow strong echo signals to be received at the transducer. To improve imaging of the needle, a steered frame can be generated by steering the ultrasound signals emitted from an ultrasound transducer so that they strike the needle at an angle that is at or close to normal to the length of the needle. The resultant angle of reflection will allow stronger echo signals to be directed towards the transducer, to produce a steered ultrasound image where the needle is more clearly shown. The example original ultrasound image 202 shown in FIG. 2 is an image resulting from a steered frame, but for which the illustrated image 202 has been adjusted back to be displayed in a purely vertical unsteered orientation. The steering angle used to acquire the steered frame may be selected based on any suitable technique (e.g., via input via a manual control). In some embodiments, the methods described herein may be used to analyze steered frames for identifying an optimal steering angle at which to image a needle, such as is described in Applicant's co-pending U.S. patent application Ser. No. 15/458,962 entitled "SYSTEMS AND METHODS FOR DETECTING AND ENHANCING VIEWING OF A NEEDLE DURING ULTRASOUND IMAGING" filed herewith, the entire contents of which are hereby incorporated by reference (referred to as "Applicant's Co-pending Application" herein).

After the performance of act 110 in the method of FIG. 1, an edge-detected data set 204 may be generated. In various embodiments, the edge-detected data set may be a binary image corresponding to the ultrasound image 202 that indicates the edges detected.

Referring back to FIG. 1, at act 120, a next act may be to perform a straight line detection operation on the edge-detected data set 204 to detect one or more straight lines. This step may differ in various embodiments. For example, in some embodiments, act 120 may involve performing one or more of the following operations on the edge-detected data set 204: contour detection, a Hough transform operation, Mathematical morphological operation, curve fitting, and/or other suitable straight line detection technique.

The performance of a contour filtering operation on the edge-detected data set 204 may remove closed shapes or other curved lines present on the edge-detected data set 204. This filtering may help to filter out lines in the ultrasound image 202 that are not likely to be an imaged needle. Similarly, a Hough transform is a feature extraction technique on the edge-detected data set 204 that may be used to identify straight lines thereon.

In some embodiments, these operations may both be performed sequentially. For example, in the example embodiment of FIG. 2, the image 206 shows an image after the performance of a counter filtering operation (shown as having 'Cleaned Edges' in FIG. 2). As, in this instance, the edge-detected data set did not have many contours or closed shapes, the result 206 of the contour filtered edge-detected data set is substantially similar to the edge-detected data set 204 itself. However, as discussed below with regards to FIG. 3, in instances where there is more anatomy or other tissue structures present, the contour filtering operation may filter edges in the edge-detected data set 204 that are unlikely to be an imaged needle.

Referring still to FIG. 2, image 208 shows the result of the Hough transform (e.g., a probabilistic Hough transform) operation being performed on image 206. As shown, the contour-filtered image 206 may have a number edges that are likely to be straight lines. However, performing the Hough transform operation may serve to identify the straight lines. As will be understood by persons skilled in the art, the Hough transform straight line detection operation may be parameterized in various ways, for example, to detect longer or shorter lines. As shown, a number of red lines are present on image 208 to reflect where the Hough transform operation may identify the straight lines on the original ultrasound image 202.

Referring back to FIG. 1, the method may then proceed to act 130. At act 130, a region of interest (ROI) on the ultrasound image 202 can be identified based on the one or more straight lines detected in the edge-detected data set 204. For example, if the ROI is performed based on individual detected straight lines, the ROI may be selected based on the longest line identified.

In various embodiments, the result of the straight line detection may identify numerous groups of straight lines in the original ultrasound image 202. For example, in the example embodiment shown in FIG. 2, the result of the straight line detection operation on the image 208 has resulted in the detection of two (2) straight lines (and potentially more that are unviewable in image 208 due to overlapping). However, even though multiple straight lines are detected, the straight lines may arise from different surfaces of a single imaged needle, and/or from the reverberation artifacts from imaging the needle. To facilitate the ease of identifying the ROI, in some embodiments, an optional additional operation (not shown in FIG. 1) to cluster the detected straight lines may be performed after detecting straight lines at act 120.

By clustering the detected straight lines that are within the vicinity and/or parallel of each other, the different lines that appear in an ultrasound image 202 can be grouped together and attributed to a single imaged needle so that the group of detected lines can collectively be identified for the ROI.

Depending on the nature of the tissue being imaged, there may be multiple groups of clustered straight lines detected at act 120. For example, in some images, there may be groups of clustered straight lines detected for an imaged needle, and groups of straight lines detected for tissue (e.g., bone, vessel walls, and the like) that produce a bright and straight lines in an ultrasound image. Thus, in embodiments where clustering of straight lines is performed, the identification of the ROI for act 130 may be based on aspects of the groups of clustered straight lines. For example, the ROI may be selected based on a density of clustered lines within a group and/or the size of the groups of clustered lines.

As shown in FIG. 2, the ROI is identified as a blue ellipse on the ultrasound image 208 containing the detected lines shown in red. In the example shown, the ROI is identified as an elliptical portion of the original ultrasound image 202. However, in some embodiments, the ROI can be a rectangular area which can represent a more accurate shape of the object of interest (e.g., the needle). In various embodiments, a non-rectangular (e.g., elliptical-shaped) ROI can be padded with zeros to allow the ROI to be more easily used for subsequent processing. In FIG. 2, this is shown in extracted and enlarged form as image 210.

Referring back to FIG. 1, at act 140, a transform operation can be performed on the ROI 210 to transform the image information therein from a spatial domain to an analysis domain. Transforming the ROI 210 information into the analysis domain may allow for the image information of the ROI 210 to be more easily analyzed. For example, the transform operation may be a Fourier transform (e.g., a Discrete Fourier transform (DFT) and/or a fast Fourier transform (FFT)) where the analysis domain is the spatial frequency domain.

In the spatial frequency domain of a Fourier transform, the brightness information of the ROI 210 can be decomposed into various component frequencies where each component frequency indicates how rapidly the brightness of an image changes or modulates across the image in various spatial orientations (e.g., along the X axis, Y axis, and numerous slanted axes at various angles).

As will be understood by persons skilled in the art, the result of performing a two-dimensional (2D) Fourier transform on a 2D brightness image can itself be presented as a brightness image. Every pixel (e.g., the peaks in the Fourier transform) of such a Fourier image corresponds to a spatial frequency, and the magnitude of the spatial frequency can be encoded by the brightness of the pixel. In such Fourier images, there may be a bright pixel at the very center for the "DC term" corresponding to the zero frequency, which represents the average brightness across the whole image. Depending on the nature of the original image on which the Fourier transform was performed, there may also be bright pixels at various distances from the center of the image: where bright pixels closer to the center of the Fourier image indicate that the original image has components with lower spatial frequency (e.g., smooth gradients), and bright pixels further away from the center of the Fourier image indicate the original image has components with higher spatial frequency (e.g., sharper edges).

The orientation of the bright pixels relative to the central point for the "DC Term" in the Fourier image correlates to the orientation of the spatial frequency component being encoded. For example, modulation in the brightness of the original image purely across a horizontal spatial frequency along the X-axis (e.g., in a simple example, a brightness image appearing to have vertical bars that alternate between bright and dark along the X-axis) will result in bright pixels appearing immediately to the left and right of the central point for the "DC Term" on the Fourier image. Similarly, modulation in the brightness of the image purely across a vertical spatial frequency along the Y-axis (e.g., in a simple example, a brightness image appearing to have horizontal bars that alternate between bright and dark along the Y-axis) will result in bright pixels immediately above and below the central DC point on the Fourier image. To the extent an original image has modulation in brightness along a slanted spatial frequency (e.g., at an angle other than purely in the X-axis or Y-axis), the corresponding bright pixels in the Fourier image will also have a corresponding tilted pattern that is at right angles to the to the direction of the spatial frequency modulation.

Referring back to FIG. 1, at act 150, the transformed ROI may be analyzed to determine whether the transformed ROI, in the analysis domain, corresponds to a needle signature. In various embodiments discussed herein, certain characteristics of the ROI 210 in the analysis domain have been identified as being indicative of an imaged needle. These characteristics may be considered a signature of an imaged needle. As discussed in detail below with respect to FIG. 3, these signatures may be used to distinguish an imaged needle from other tissues that might otherwise be mistaken for an imaged needle.

In various embodiments, the transformed ROI includes pixel values in the analysis domain having a first orientation relationship, and the needle signature may be a second orientation relationship. In such embodiments, the analyzing act at 150 may involve comparing the first orientation relationship of the pixel values in the transformed ROI to the second orientation relationship.

For example, referring simultaneously to the example embodiment of FIG. 2 (where the analysis domain is the spatial frequency domain of the Fourier transform), the Fourier image 212 shows the result of having applied a Fourier transform to the ROI 210. The Fourier image 212 has a number of bright pixels near the center of the image. This cluster of bright pixels there shows there is regularity in the textures of the needle images. In FIG. 2, the example ROI 210 is shown with some image smoothing; however, in various embodiments, an ROI may contain more clearly defined periodic lines that reflect texture regularity.

Also, the various bright pixels appear to generally form a line that is at right angles to the slanted appearance of the imaged needle in the ROI 210. As noted above, the angle of this line in the Fourier image 212 reflects the slanted angle of the imaged needle, and the presence of pixels close to the DC point along such line generally indicates that there is low spatial frequency (e.g. gradients in brightness) along a direction perpendicular to the slanted angle of the bright band in the ROI 210.

In some embodiments, a linear regression may be performed on the non-dark pixel locations in the Fourier image 212, and the angle of the resultant line may be considered an orientation relationship used to determine whether the transformed ROI 212 corresponds to a needle signature at act 150. For example, if the identified ROI contained an image that appeared as if it was generally a strip or band of bright pixels close to or parallel with X-axis, the bright pixels in the corresponding Fourier image 212 may appear generally vertical. Since an imaged needle in an ultrasound image 202 is not likely to appear as a bright band or strip of pixels at or close to parallel with the X-axis (e.g., due to a needle's insertion angle), a threshold value for the angle of the bright pixels in the Fourier image 212 may be used as the orientation relationship for a needle signature. For example, in some embodiments, the threshold value for the angle may be 10 degrees from the Y-axis, and any line in the Fourier image 212 having an angle less than this value (e.g., the line is more vertical) may be considered to not correspond to a needle signature.

Additionally or alternatively, the orientation relationship used for determining correspondence to a needle signature at act 150 may be a linearity measurement of the pixel values in the transformed ROI 212, and the second orientation relationship may be a threshold for the linearity measurement. For example, in embodiments where the transform at act 140 is a Fourier transform such as is shown in FIG. 2, the linearity of the pixel values may constitute a needle signature. As shown in FIG. 2, the Fourier image 212 has a line that appears generally linear. To obtain a measurement of the linearity of the pixel values in the transformed ROI 212 any suitable technique may be used.

For example, the linearity measurement can be the eigenvalue ratio of the pixel values in the Fourier image 212 (which, in the example embodiment, is the magnitude of the Fourier transform). As will be understood by persons skilled in the art, the covariance of a group of 2D data points (e.g., the extent a change in a value in the X direction correlates to a change in the Y direction) can be represented by a covariance matrix. Eigen decomposition of a given covariance matrix may provide information about the linearity of the data. For example, the largest eigenvector of the covariance matrix may point into the direction of the largest variance of the data, and the magnitude of the vector equals the corresponding eigenvalue. The second largest eigenvector will be orthogonal to the largest eigenvector and will point into the direction of the second largest spread of the data. The corresponding eigenvalue will be the magnitude of the second largest vector. By taking a ratio of the larger eigenvalue over the second largest eigenvalue, a measurement of the linearity of the data can thus be obtained. For example, a large eigenvalue ratio may indicate that the data spread along the lengthwise axis is large relative to the spread of data along the shorter axis. In contrast, a small eigenvalue ratio may suggest that the spread of data in one direction is not significantly larger than in the second largest direction; e.g., the data points are not substantially linear.

Referring back to FIG. 1, at act 160, if the transformed ROI corresponds to the needle signature, the detected one or more straight lines identified in image 208 may be identified as the imaged needle. In the example of FIG. 2, the eigenvalue ratio 214 of the Fourier image 212 is determined to be '105.77'. In various embodiments, the threshold value for when an eigenvalue ratio is determined to constitute a needle signature can be set to 50 or any other suitable number based on testing. In this example, since the determined '105.77' eigenvalue ratio of the values in the transformed ROI 212 exceeds the threshold value, the image information contained in the ROI 210 (and the corresponding detected lines in image 208) may be identified as an imaged needle.

Upon identifying the detected one or more straight lines as the imaged needle, some additional acts may be performed to enhance viewing of the identified imaged needle in an ultrasound image feed. For example, the identification of an imaged needle may allow for selection of an optimal steering angle for imaging the needle, and progression from the survey phase to the needle enhancement phase in the method discussed in Applicant's Co-pending Application.

To enhance viewing of an identified imaged needle, a mask 216 (as shown in FIG. 2) may be created based on the ROI 210 to segment the identified imaged needle from the underlying ultrasound image 202 (e.g., for the purpose of highlighting the identified imaged needle). As will be understood by persons skilled in the art, masking involves setting certain pixel values in an image to zero (for the portion of the image that is to be obscured) and others to non-zero (for the portion of the image that is to be retained). The mask 216 may have non-zero values based on the ROI 210 and zero values elsewhere. When the mask 216 is applied to the original ultrasound image 202, the portion of the ultrasound image 202 corresponding to the non-zero values remains to highlight the identified imaged needle. However, the zero values in the mask 216 obscure the remaining portions of the ultrasound image 202 not belonging to the identified imaged needle.

In FIG. 2, the mask 216 is shown with the zero values in black and the non-zero values in white. Image 218 then illustrates the combination of the mask 216 with the original ultrasound image 202. As can be seen, the image of the identified needle corresponding to the location of non-zero pixels in 216 has been retained. However, image information that was previously visible in the original ultrasound image 202 but which corresponds to the zero pixels in the mask 216 (e.g., certain image artifacts appearing below the imaged needle) has been obscured in image 218.

In various embodiments, the masked ultrasound image 218 may then be displayed by overlaying it on top of a regular unsteered frame (e.g., B-mode frames) used for imaging tissue 130. For example, when overlaid, the masked portion of the image 218 (e.g., the zero pixels of the mask 216) will become "transparent" and display the underlying image information of the regular unsteered frame, and the retained image of the needle will be shown in conjunction with the underlying image of the tissue acquired using the unsteered frame.

As noted above, ultrasound images generated using regular unsteered frames that image the tissue may not provide visualization of a needle because the insertion angle of the needle causes the ultrasound signals to generally not be reflected back towards the transducer head. A steered frame may enhance the echo signals reflected from the needle so that the imaged needle appears in the resultant image. However, the original ultrasound image 202 shown in FIG. 2 cannot simply be overlaid on top of a regular unsteered frames because the echo signals of the tissue in the original image 202 may contain image artifacts (e.g., reverberation artifacts).

By masking the portion of the original image 202 containing such artifacts, the retained portion of the image having the identified imaged needle may be overlaid on top of a regular unsteered frame to enhance viewing of the imaged needle without impacting the image of tissues in the regular unsteered frame. In various embodiments, the overlaying of the masked ultrasound image 218 on regular unsteered frames may be performed during the needle enhancement phase of the method described in Applicant's Co-pending Application submitted herewith.

In various embodiments, the needle appearing in the masked image 218 may be further enhanced with visual effects such as color and/or projections as to the historical or future travel path of the imaged needle. In various embodiments, the present methods may be repeatedly performed to allow tracking of a needle as the needle moves through the tissue (e.g., this may involve repeated updating of the location of the ROI on steered ultrasound frames as they are acquired). For example, such tracking this may constitute the continuous determining of whether the needle has become absent in the method described in Applicant's Co-pending Application.

In various embodiments, the size and shape of the retained area in the mask 216 may vary. For example, in some embodiments, the retained area of the mask 216 can be a rectangular shape or a square shape of the zero-padded version of the ROI 210. In some embodiments, the retained area of the mask 216 can be the initial elliptical ROI identified at act 130 of FIG. 1 (e.g., shown in blue in image 208 of FIG. 2). Additionally or alternatively, in some embodiments, the retained area of the mask 216 can be configured to also be an elliptical shape that is similar to the ROI 210 identified at act 130; but enlarged along the long axis of the ellipse (e.g., as is shown in green in image 208 of FIG. 2, with the edges of the ellipse being off by the edges of the image and cut off). Having the retained area in the mask 216 be larger than the original ROI identified at act 130 may improve visual enhancement when overlaying the masked image 218 on an unsteered frame. For example, since an imaged needle will generally be linear, expanding the retained area in the mask 216 in this manner beyond the ROI 210 may allow the visual enhancement to be applied in a manner that shows portions of the needle that are not imaged (e.g., if portions of the needle are out of the field of view). Additionally or alternatively, the expanded retained area in the mask 216 may allow visual enhancement of the projected travel of a needle because the travel path of a needle during an intervention procedure will generally also be linear.

Referring to FIG. 3, shown there generally as 300 is a series of images showing the result of performing acts of the present methods on an ultrasound image having tissue, in accordance with at least one embodiment. FIG. 2 shows the performance of the method of FIG. 1 in an example scenario where an imaged needle was present in an ultrasound image. In contrast, FIG. 3 shows the application of the method of FIG. 1 on an ultrasound image having tissue (e.g., bone) that traditional methods may falsely identify as a needle. As discussed below, the performance of the method of FIG. 1 on such images may generally result in fewer false positive needle identifications. In discussing the images shown in FIG. 3, reference will be made to the acts of the method of FIG. 1. It will be understood that the various ways in which the acts of FIG. 1 can be performed as discussed above with respect to the images of FIG. 2 are also applicable to the images of FIG. 3.

In FIG. 3, an original ultrasound image 202' of tissue is shown. In this example embodiment, the image is of a bone in the human wrist. As many bones are typically straight and echogenic, the original ultrasound image 202' contains a bright line that is slanted in a manner that may typically be considered an imaged needle in traditional methods. Also shown in the original ultrasound image 202' of FIG. 3 are echo signal data from other tissue structures below and above the image of the bone.

Referring simultaneously to FIG. 1, act 110 involves performing edge detection on the original ultrasound image 202' to generate an edge-detected data set. The edge-detected data set 204' is illustrated in FIG. 3 as showing the edges for the slanted bone structure imaged in original ultrasound image 202'. The edges for other tissue structures above and to the right of the bone structure are also detected and shown in the edge-detected data set 204'.

At act 120 of FIG. 1, a next act may be to perform a straight line detection operation on the edge-detected data set 204' to detect one or more straight lines. As with the example shown in FIG. 2, FIG. 3 shows an example where contour filtering may be performed to filter out lines in the original ultrasound image 202' that are unlikely to be an imaged needle. As shown in FIG. 3, the image 206' shows the result after performing a contour filtering operation. It can be seen that a number of the rounded edges for the smaller imaged structures above and to the right of the larger edges belonging to the imaged bone are filtered out.

Referring still to FIG. 3, image 208' shows the result of a particular straight line detection technique (e.g., the Hough transform) being performed on image 206'. As noted above, the Hough transform straight line detection operation may be parameterized in various ways, for example, to detect longer or shorter lines. As shown, a red line is shown on image 208' to reflect where the Hough transform operation may identify the straight line(s) on the original ultrasound image 202'.

Notably, if only straight line detection was performed for needle identification in an ultrasound image, the image of the bone being both generally bright and straight may result in the straight line being falsely identified as a needle. However, in the present embodiments, the method does not end with straight line detection. Rather, the method proceeds to act 130 of FIG. 1 to identify a ROI on the ultrasound image 202', based on the one or more detected straight lines. As shown in image 208', the ROI may be identified as an ellipse (shown in blue in image 208' of FIG. 3) around the straight line shown in red. Like what was discussed above for FIG. 2, the identified ROI can be extracted, zero-padded, and enlarged for viewing as image 210'.

Referring simultaneously to the ROI 210' in FIG. 3 and the ROI 210 in FIG. 2, it can be seen that both ROIs generally contain slanted bright shapes. While it may be challenging to distinguish between the ROI of an imaged needle in image 210 versus the ROI 210' of a bone based on analysis of image information, the present embodiments facilitate improved analysis by performing a transform operation on the ROI 210, 210' to transform the image information therein from a spatial domain to an analysis domain (act 140 in FIG. 1). As noted, the transform operation may be a Fourier transform (e.g., a Discrete Fourier transform (DFT) and/or a fast Fourier transform (FFT)) where the analysis domain is the spatial frequency domain. For example, referring simultaneously to the example embodiment of FIG. 3 (where the analysis domain is the spatial frequency domain of the Fourier transform), the Fourier image 212' shows the result of having applied a Fourier transform to the ROI image 210'.

Referring back to FIG. 1, at act 150, the transformed ROI may be analyzed to determine whether the transformed ROI, in the analysis domain, corresponds to a needle signature. As noted, the analyzing act at 150 may involve comparing a first orientation relationship of the pixel values in the transformed ROI 212' to a second orientation relationship. In some embodiments, the orientation relationship used for determining correspondence to a needle signature may be a linearity measurement of the pixel values in the transformed ROI 212', and the second orientation relationship may be a threshold for the linearity measurement.

At act 160 of FIG. 1, if the transformed ROI 212' corresponds to the needle signature, the detected one or more straight lines identified in image 208' may be identified as the imaged needle. Correspondingly, if the transformed ROI 212' does not correspond to the needle signature, the detected one or more straight lines identified in image 208' may be identified as not being the imaged needle. As noted above, in an example embodiment, the linearity measurement for which a threshold is provided to constitute a needle signature can be the eigenvalue ratio of the bright pixels in the Fourier image 212'

As shown in FIG. 3, the Fourier image 212' corresponding to the ROI 210 has pixels that appears generally linear. However, referring simultaneously to the Fourier image 212 in FIG. 2, it can be seen that unlike the pixels in the Fourier image 212 of the ROI 210 having the actual imaged needle, Fourier image 212' has a greater spread of pixels in a direction orthogonal to the general length of the line. Thus, the eigenvalue ratio 214' of the pixels in the Fourier image 212' of FIG. 3 will be much lower at '12.779'. This is compared to the eigenvalue ratio of the Fourier image 212 in FIG. 2 which is '105.77'. In the example embodiment where the threshold value for when an eigenvalue ratio for a needle signature is set to fifty (50), the eigenvalue ratio of '12.779' will not correspond to a needle signature, and the image information contained in the ROI 210' (and the corresponding detected lines in image 208') may not be identified as an imaged needle.

As discussed above, a 2D Fourier image captures the presence of regular (e.g., periodic) textures in an image at various component spatial frequencies in the underlying 2D brightness image. In the present embodiments, the linearity of the pixel locations in a 2D Fourier image of an ROI can be taken to be a needle signature. Generally, this may mean that the ROI containing a bright and straight line of an imaged needle is likely to be made up of spatial frequency components in a relatively narrow range of orientations (e.g., with the pixels in a corresponding Fourier image being generally linear). In contrast, while certain ultrasound images of tissue (e.g., bone, fascia, vessel walls, tendons) may visually appear also as bright and straight lines, an ROI containing such images is likely made up of spatial frequency components having a relatively broader range of orientations (e.g., the component frequencies are less uniform in their orientation such that the pixels in a corresponding Fourier image are not as linear).

Notably, the performance of the transform operation (e.g., the Fourier transform) at act 140 of FIG. 1 as discussed herein is not on the entirety of the original ultrasound image 202, 202' itself. Rather, the performance of the transform operation is on the image data of an ROI 210, 210' identified after performance of edge detection and straight line detection techniques. By limiting the input to the transform operation, it may be possible to obtain a cleaner view of the transformed ROI in the analysis domain that is not obscured by unrelated image data not belonging to an imaged needle. It may also reduce the processing required to perform the transform operation (e.g., to better enable it to run on a lightweight and portable ultrasound acquisition unit, as is described below in relation to FIG. 5).

Referring back to FIG. 3, since the ROI 210' and corresponding detected line(s) in image 208' was not determined to correspond to a needle signature, a resulting mask would obscure the entire original ultrasound image 202' and not have any retained portion. This mask 216' is shown in FIG. 3 as having all dark pixels to reflect that all pixels in this scenario will be zeroed. Image 218' then illustrates the combination of the mask 216' with the original ultrasound image 202'. As can be seen, since the mask 216' had all zero pixels, all of the image data in the original ultrasound image 202' is obscured and not viewable in image 218'. When the image 218' having all zeros is then overlaid on top of a regular unsteered frame for imaging tissue (e.g., as discussed above), only the underlying image information in the unsteered frame will be displayed and there will be no visual enhancement. In this scenario, this is the correct result because the bright and straight line appearing in the original ultrasound image 202' was tissue (e.g., bone) and not an imaged needle, and should therefore not be mistakenly enhanced visually. As discussed in greater detail in Applicant's Co-pending Application in an example embodiment, the repeated failure to identify an imaged needle in the needle enhancement phase of the method discussed therein may result in a return to the survey phase of that method.

In various embodiments, aspects of the method of FIG. 1 may differ. For example, while the embodiments discussed herein have the transformed ROI analyzed at act 150 being a 2D image containing the magnitude values from a Fourier transform, in other embodiments, the transformed ROI may contain (and the needle signature may be found in) the phase values from a Fourier transform of a ROI's information. Additionally or alternatively, in some embodiments, a Fourier transform may not be used at all at act 140 and other transforms (e.g., a wavelet transform) may be performed at act 140.

In various embodiments, pre-processing of the original ultrasound image 202 is performed prior to an ultrasound image being inputted to the methods described herein. An example pre-processing step includes filtering out purely or close to purely horizontal lines that are not likely to be an imaged needle. For example, since such needles will likely be perpendicular to the direction of ultrasound beam travel of an unsteered regular frame, they will generally show up in an ultrasound quite clearly without substantial need for visual enhancement.

In further embodiments, an ultrasound image may be downsampled prior to being processed according to the methods described herein, and if an imaged needle is detected, the created mask may be upsampled prior to the combining the mask with the original ultrasound image. This type of downsampling/upsampling may reduce the amount of image data on which the methods are performed. In turn, this may lower the processing required to perform the methods described herein, and enhanced efficiency and performance (e.g., of an ultrasound acquisition unit 504 performing such methods, such as is described below in FIG. 5).

Figure 4:
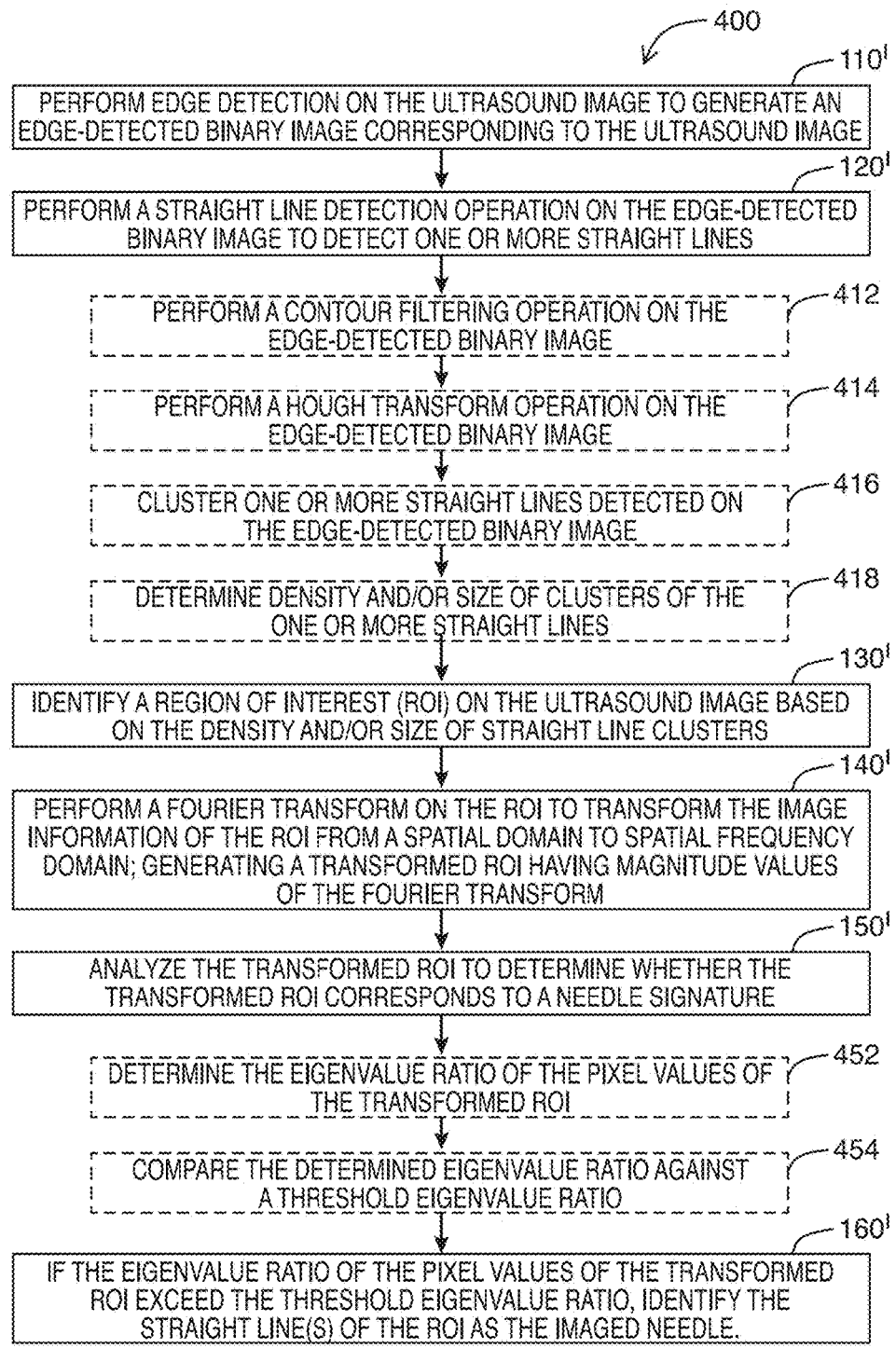
FIG. 4 is a flowchart diagram showing steps of a method for identifying an imaged needle in an ultrasound image, in accordance with at least one embodiment of the present invention.

Referring to FIG. 4, shown there generally as 400 is a flowchart diagram showing steps of another method for identifying an imaged needle in an ultrasound image, in accordance with at least one embodiment of the present invention. Some acts of the method 400 may be analogous to the acts of the method 100 of FIG. 1. Also, in FIG. 4, certain example acts that may be performed as a part of other acts are shown in dotted outline. Some of the acts discussed in FIG. 4 may also generally correspond to images shown in FIGS. 2 and 3 discussed above. However, it will be understood that the method 400 of FIG. 4 as illustrated and discussed herein is only one example embodiment of many different embodiments of the present invention.

At act 110', the method involves performing edge detection on an ultrasound image to generate an edge-detected binary image corresponding to the ultrasound image.

At act 120', a next act may involve performing a straight line detection operation on the edge-detected binary image to detect one or more straight lines. As a part of performing the straight line detection operation, the method may perform acts 412-418. Act 412 involves performing a contour filtering operation on the edge-detected binary image. Act 414 involves performing a Hough transform operation on the edge-detected binary image (e.g., to detect straight edges). Act 416 involves clustering the one or more straight lines detected on the edge-detected binary image. Act 418 involves determining a density and/or size of clusters of the one or more detected straight lines.

At act 130', an ROI may be identified on the ultrasound image based on the density and/or size of the straight line clusters determined at act 418.

At act 140', a Fourier transform may be performed on the ROI to transform the image information of the ROI from a spatial domain to a spatial frequency domain; to generate a transformed ROI having magnitude values of the Fourier transform.

At act 150', the transformed ROI may be analyzed to determine whether the transformed ROI corresponds to a needle signature. When determining whether the transformed ROI corresponds to a needle signature, acts 452-454 may be performed. Act 452 involves determining an eigenvalue ratio of the pixel values of the transformed ROI. Act 454 involves comparing the determined eigenvalue ratio against a threshold eigenvalue ratio.

At act 160', if the eigenvalue ratio of the pixel values of the transformed ROI exceed the threshold eigenvalue ratio, the straight line(s) of the ROI are identified as the imaged needle.

Figure 5:
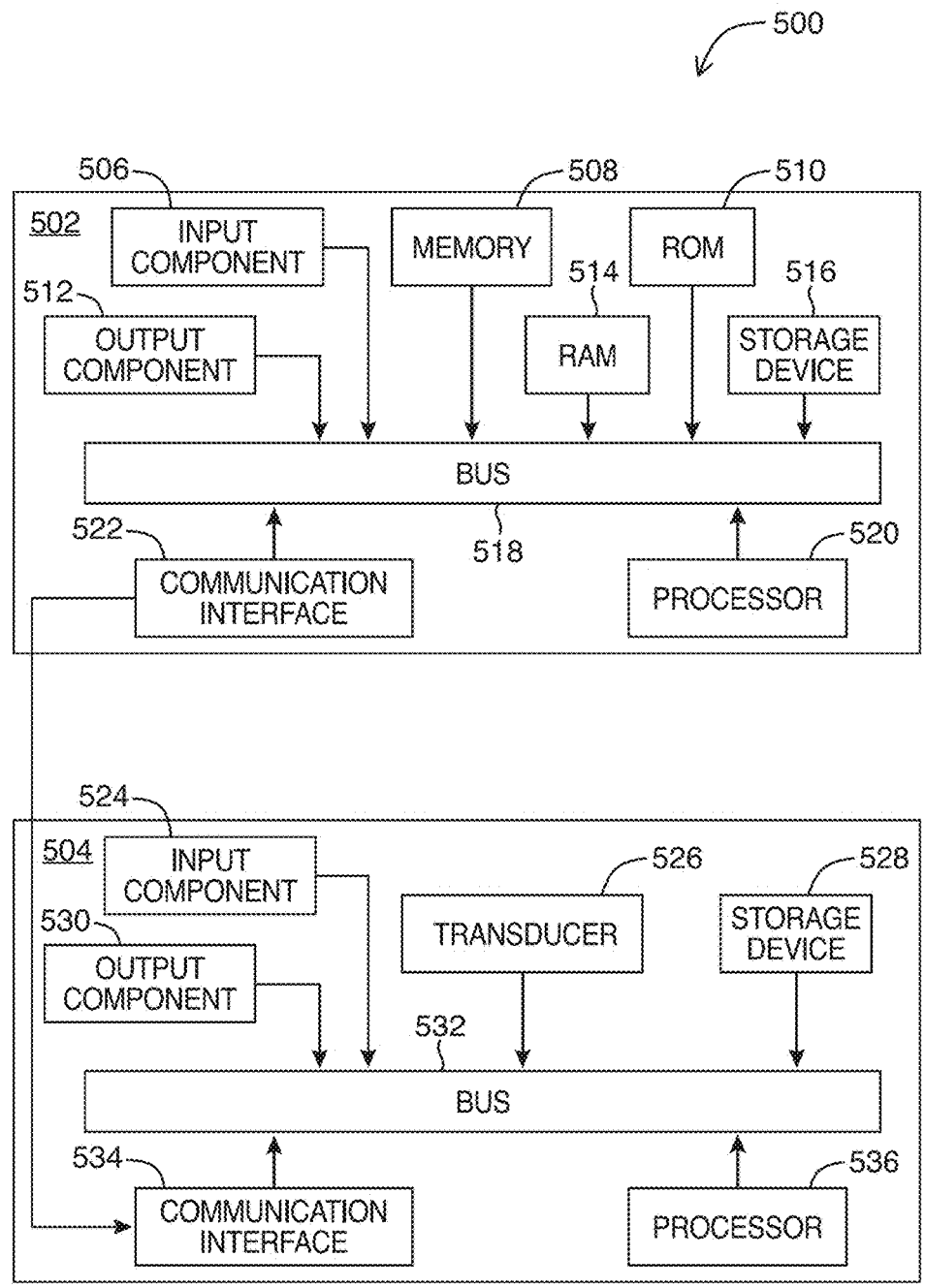
FIG. 5 shows a functional block diagram of an ultrasound system, in accordance with at least one embodiment of the present invention.

Referring to FIG. 5, shown there generally as 500 is a functional block diagram of an ultrasound system and/or apparatus, in accordance with at least one embodiment of the present invention. For example, one or more components of the ultrasound imaging system 500 may be configured to perform the methods of FIGS. 1 and/or 4 to identify an imaged needle in an ultrasound image.

Ultrasound imaging system 500 may include an ultrasound acquisition unit 504 configured to transmit ultrasound energy to a target object, receive ultrasound energy reflected from the target object, and generate ultrasound image data based on the reflected ultrasound energy. The ultrasound acquisition unit 504 may include a transducer 526 which converts electric current into ultrasound energy and vice versa. Transducer 526 may transmit ultrasound energy to the target object which echoes off the tissue. The echoes may be detected by a sensor in transducer 526 and relayed through a bus 532 to a processor 536. Processor 536 may interpret and process the echoes to generate image data of the scanned tissue. In some embodiments, the ultrasound acquisition unit 504 (or various components thereof) may be provided as a handheld ultrasound probe that is in communication with other components of the ultrasound imaging system 500. For example, the handheld probe may include the transducer 526 of ultrasound acquisition unit 504. Ultrasound acquisition unit 504 may also include storage device 528 (e.g., a computer readable medium, coupled to and accessible by bus 532) for storing software or firmware instructions, configuration settings (e.g., sequence tables), and/or ultrasound image data.

Although not illustrated, as will be apparent to one of skill in the art, the ultrasound imaging system 500 may include other components for acquiring, processing and/or displaying ultrasound image data. These include, but are not limited to: a scan generator, transmit beamformer, pulse generator, amplifier, analogue to digital converter (ADC), receive beamformer, signal processor, data compressor, wireless transceiver and/or image processor. Each of these may be components of ultrasound acquisition unit 504 and/or electronic display unit 502 (described below).

Ultrasound imaging system 500 may include an electronic display unit 502 which is in communication with ultrasound acquisition unit 504 via communication interfaces 522/534. In various embodiments, communication interfaces 522/534 may allow for wired or wireless connectivity (e.g., via Wi-Fi™ and/or Bluetooth™) between the electronic display unit 502 and the ultrasound acquisition unit 504. Electronic display unit 502 may work in conjunction with ultrasound acquisition unit 504 to control the operation of ultrasound acquisition unit 504 and display the images acquired by the ultrasound acquisition unit 504. An ultrasound operator may interact with the user interface provided by display unit 502 to send control commands to the ultrasound acquisition unit 504 (e.g., to initiate an intervention procedure mode that begins operation of the methods for identifying an imaged needle described herein and/or the methods described in the Applicant's Co-pending Application). The electronic display unit 502 may be a portable device, which may include a mobile device (e.g. smartphone), tablet, laptop, or other suitable device incorporating a display and a processor and capable of accepting input from a user and processing and relaying the input to control the operation of the ultrasound acquisition unit 504 as described herein.

Each of ultrasound acquisition unit 504 and display unit 502 may have one or more input components 524, 506 and/or one or more output components 530, 512. In the FIG. 5 embodiment, ultrasound acquisition unit 504 may include an input component 524 which is configured to accept input from the user (e.g., to turn on the ultrasound acquisition unit 504 or control the connection of the ultrasound acquisition unit 504 to the electronic display unit 502). For example, in some embodiments, ultrasound acquisition unit 504 may also include an output component 530, such as a LED indicator light which can output the status of the ultrasound acquisition unit 504.

In the FIG. 5 embodiment, display unit 502 may include an input component 506 configured to accept input from the user. Certain input received at input component 506 may be relayed to ultrasound acquisition unit 504 to control the operation of ultrasound acquisition unit 504. Display unit 502 may also include an output component 512, such as a display screen, which displays images based on image data acquired by ultrasound acquisition unit 504 (e.g., images having enhanced viewing of the imaged needle). In particular embodiments, display unit 502's input component 506 may include a touch interface layered on top of the display screen of the output component 512. Electronic display unit 502 may also include memory 508, Random Access Memory (RAM) 514, Read Only Memory (ROM) 510, and persistent storage device 516, which may all be connected to bus 518 to allow for communication therebetween and with processor 520. Ultrasound acquisition unit 504 may contain memory (e.g., storage device 528) that may be accessible by processor 536. Any number of these memory elements may store software or firmware that may be accessed and executed by processor 520 and/or processor 536 to, in part or in whole, perform the acts of the methods described herein (e.g., so that the processor 520 and/or processor 536 is configured to perform the methods described herein to identify an imaged needle in an ultrasound image).

Scan conversion is a process that converts image data to allow it to be displayed in a form that is more suitable for human visual consumption. For example, this may involve converting the image data from the data space (e.g. polar coordinate form) to the display space (e.g. Cartesian coordinate form). Depending on the location of where the methods of the present embodiments are performed, the original ultrasound images on which the methods are performed may differ. For example, if the methods described herein are performed by processor 536 on the ultrasound acquisition unit 504, the ultrasound images 202, 202' (e.g., as shown in FIGS. 2 and 3) on which the methods may be performed may be pre-scan-converted data. Additionally or alternatively, if the methods described herein are performed by processor 520 on the display unit 502, the methods described herein may be performed on post-scan-converted data.

In various embodiments, the acts of the methods described herein are sufficiently processor-efficient that they may be performed on an ultrasound acquisition unit 504 (e.g., and in conjunction with the methods described in Applicant's Co-pending Application) without significant decrease in frame rate in the displayed ultrasound image feed on a display unit 502. For example, by identifying a ROI prior to performing a transform operation (and performing a transform operation only on a ROI that is likely to have an imaged needle), the processing resources required to perform the transform can be reduced. The efficiency of the method may allow it operate on an ultrasound acquisition unit 504 with a lightweight, portable design and construction (e.g., when it is a handheld probe). In particular embodiments, the handheld probe may have a mass that is less than approximately 1 kg (2 lbs).

Additionally or alternatively, in some embodiments, at least a portion of the processing of the image data corresponding to the reflected ultrasound energy detected by the handheld probe's transducer 526 may be performed by one or more of processors internal to the ultrasound acquisition unit 504 (such as by the processor 536) and/or by processors external to the ultrasound acquisition unit 504 (such as the processor 520 of electronic display unit 502). For example, one or more acts of the methods described herein may be performed by processor 520 in display unit 502.

In some embodiments, all the input controls and display screen necessary for the operation of the ultrasound imaging system 500 may be provided by input and output components 506, 512 of the display unit 502. In such cases input and output components 524, 530 of ultrasound acquisition unit 504 may be optional and/or omitted. In certain embodiments, the ultrasound acquisition unit 504 may be a handheld probe (e.g., including transducer 526) which is in communication with the display unit 502 over the communications interfaces 522/534 to facilitate operation of the ultrasound acquisition unit 504 and processing and display of ultrasound images.

In some embodiments, the output component 530 of ultrasound acquisition unit 504 may include a display screen, which can be configured to display or otherwise output the images acquired by ultrasound acquisition unit 504 (in addition to or alternative to displaying such images on the display unit 502).

While a number of exemplary aspects and embodiments have been discussed above, those of skill in the art will recognize that may be certain modifications, permutations, additions and sub-combinations thereof. While the above description contains many details of example embodiments, these should not be construed as essential limitations on the scope of any embodiment. Many other ramifications and variations are possible within the teachings of the various embodiments.

Interpretation of Terms

Unless the context clearly requires otherwise, throughout the description and the
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Unless the context clearly requires otherwise, throughout the description and the claims:

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

For example, while processes or blocks are presented in a given order herein, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The invention may also be provided in the form of a program product. The program product may comprise any non-transitory medium which carries a set of computer-readable instructions which, when executed by a data processor (e.g., in a controller and/or ultrasound processor in an ultrasound machine), cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or pre-programmed chips (e.g., EEPROM semiconductor chips), nanotechnology memory, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method of identifying an imaged needle in an ultrasound image, the method comprising:
performing edge detection on the ultrasound image to generate an edge-detected data set corresponding to the ultrasound image;
performing a straight line detection operation on the edge-detected data set to detect one or more straight lines;
based on the one or more straight lines detected in the edge-detected data set, identifying a region of interest (ROI) on the ultrasound image;
transforming the ROI of the ultrasound image from a spatial domain to an analysis domain, to generate a transformed ROI;
analyzing the transformed ROI to determine whether the transformed ROI, in the analysis domain, corresponds to a needle signature; and
if the transformed ROI corresponds to the needle signature, identifying the detected one or more straight lines as the imaged needle.

2. The method of claim 1, wherein the transforming comprises performing a Fourier transform on the ROI, and the analysis domain comprises the spatial frequency domain.

3. The method of claim 1, wherein the transformed ROI comprises first pixel values in the analysis domain having a first orientation relationship, and the needle signature comprises a second orientation relationship, and the analyzing comprises comparing the first orientation relationship of the first pixel values to the second orientation relationship.

4. The method of claim 3, wherein the first orientation relationship comprises a linearity measurement of the first pixel values, and the second orientation relationship comprises a threshold for the linearity measurement.

5. The method of claim 4, wherein the linearity measurement comprises an eigenvalue ratio of the first pixel values.

6. The method of claim 1, wherein prior to performing the straight line detection operation, the method further comprises:
performing a contour filtering operation on the edge-detected data set.

7. The method of claim 1, wherein the straight line detection operation comprises a Hough transform operation.

8. The method of claim 1, further comprising clustering the one or more straight lines detected on the edge-detected data set.

9. The method of claim 8, wherein the identifying the ROI is based on a density of the clustered one or more straight lines.

10. The method of claim 8, wherein the clustering results in groups of clustered lines, and the identifying the ROI is based on respective sizes of the groups of clustered lines.

11. The method of claim 1, wherein the edge-detected data set comprises a binary image corresponding to the ultrasound image.

12. The method of claim 1, further comprising downsampling the ultrasound image, and wherein the edge detection is performed on the downsampled ultrasound image.

13. The method of claim 1, wherein upon identifying the detected one or more straight lines as the imaged needle, the method further comprises:
creating a mask highlighting the imaged needle; and combining the mask with the ultrasound image.

14. The method of claim 13, wherein the mask is upsampled prior to the combining of the mask with the ultrasound image.

15. An ultrasound imaging apparatus for identifying an imaged needle in an ultrasound image comprising:
a processor; and
a memory storing instructions for execution by the processor, wherein when the instructions are executed by the processor, the processor is configured to:
perform edge detection on the ultrasound image to generate an edge-detected data set corresponding to the ultrasound image;
perform a straight line detection operation on the edge-detected data set to detect one or more straight lines;
based on the one or more straight lines detected in the edge-detected data set, identify a region of interest (ROI) on the ultrasound image;
transform the ROI of the ultrasound image from a spatial domain to an analysis domain, to generate a transformed ROI;
analyze the transformed ROI to determine whether the transformed ROI, in the analysis domain, corresponds to a needle signature; and
if the transformed ROI corresponds to the needle signature, identify the detected one or more straight lines as the imaged needle.

16. The ultrasound imaging apparatus of claim 15, wherein the transform comprises performing a Fourier transform on the ROI, and the analysis domain comprises the spatial frequency domain.

17. The method of claim 15, wherein the transformed ROI comprises first pixel values in the analysis domain having a first orientation relationship, and the needle signature comprises a second orientation relationship, and the analyzing comprises comparing the first orientation relationship of the first pixel values to the second orientation relationship.

18. The method of claim 17, wherein the first orientation relationship comprises a linearity measurement of the first pixel values, and the second orientation relationship comprises a threshold for the linearity measurement.

19. A non-transitory computer readable medium storing instructions for identifying an imaged needle in an ultrasound image, the instructions for execution by a processor of a computing device, wherein when the instructions are executed by the processor, the processor is configured to:
perform edge detection on the ultrasound image to generate an edge-detected data set corresponding to the ultrasound image;
perform a straight line detection operation on the edge-detected data set to detect one or more straight lines;
based on the one or more straight lines detected in the edge-detected data set, identify a region of interest (ROI) on the ultrasound image;
transform the ROI of the ultrasound image from a spatial domain to an analysis domain, to generate a transformed ROI;
analyze the transformed ROI to determine whether the transformed ROI, in the analysis domain, corresponds to a needle signature; and
if the transformed ROI corresponds to the needle signature, identify the detected one or more straight lines as the imaged needle.

20. The computer readable medium of claim 19, wherein the transform comprises performing a Fourier transform on the ROI, and the analysis domain comprises the spatial frequency domain.

* * * * *